(12) United States Patent
Lee

(10) Patent No.: US 7,408,711 B2
(45) Date of Patent: Aug. 5, 2008

(54) POLARIZING PLATE, METHOD FOR MANUFACTURING THE SAME, AND LIQUID CRYSTAL DISPLAY PANEL HAVING THE SAME

(75) Inventor: Jae Ho Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 30 days.

(21) Appl. No.: 11/538,840

(22) Filed: Oct. 5, 2006

(65) Prior Publication Data

US 2007/0097300 A1    May 3, 2007

(30) Foreign Application Priority Data

Oct. 31, 2005   (KR)   .................. 10-2005-0103134

(51) Int. Cl.
*G02B 5/30*   (2006.01)

(52) U.S. Cl. .................. 359/494; 359/500; 349/96; 349/117

(58) Field of Classification Search .................. None
See application file for complete search history.

(56) References Cited

U.S. PATENT DOCUMENTS 6,476,892 B2 * 11/2002 Aminaka .................. 349/117
2005/0248846 A1 * 11/2005 Sakamaki .................. 359/490

* cited by examiner

*Primary Examiner*—Arnel C Lavarias
(74) *Attorney, Agent, or Firm*—Cantor Colburn LLP

(57) ABSTRACT

A polarizing plate including a polarizer for polarizing incident light; first and second protection films arranged respectively on top and bottom surfaces of the polarizer; and an optical compensation film arranged on the first or second protection film, wherein the optical compensation film includes a moisture absorption rate substantially similar to moisture absorption rates of the protection films.

12 Claims, 10 Drawing Sheets

| Prior Art (17") | | | Present Invention (17") | | |
|---|---|---|---|---|---|
| Upper Polarizing Plate | Lower Polarizing Plate | Total | Upper Polarizing Plate | Lower Polarizing Plate | Total |
| 0.23% | 0.43% | 0.66% | 0.05% | 0.06% | 0.05% |
| Prior Art (32") | | | Present Invention (32") | | |
| Upper and Lower Polarizing Plates | | | Upper and Lower Polarizing Plates | | |
| 20% | | | 5% | | |

POLARIZING PLATE, METHOD FOR MANUFACTURING THE SAME, AND LIQUID CRYSTAL DISPLAY PANEL HAVING THE SAME

This application claims priority to Korean Patent application No. 10-2005-0103134 filed on Oct. 31, 2005, and all the benefits accruing therefrom under 35 U.S.C. §119, the contents of which are herein incorporated by reference in its entirety.

BACKGROUND OF THE INVENTION

1. Field of the Invention

The present invention relates to a polarizing plate, a method for manufacturing the same, and a liquid crystal display panel having the same, and more particularly, to a polarizing plate in which bending due to difference between shrinkage and expansion rates is prevented by controlling a moisture absorption rate of a compensation film thereof, a method for manufacturing the same, and a liquid crystal display panel having the same.

2. Description of the Related Art

In general, the application of liquid crystal displays (LCDs) has been extended because of their features of light weight, slimness, low-power drive, full colors, high resolution and the like. At present, LCDs are used in computers, notebook computers, PDAs, telephones, TVs, audio/video devices, and the like. Such an LCD displays desired images on an LCD panel by adjusting the quantity of light to be transmitted in response to image signals applied to a plurality of control switches arrayed in a matrix.

FIG. 1 is a view illustrating a structure of a general polarizing plate. The polarizing plate shown in FIG. 1 comprises a polarizer 21, protection films 22a and 22b, an adhesive 23, and surface protection films 24a and 24b. The polarizer 21 is arranged between the protection films 22a and 22b to polarize incident light. The adhesive 23 has the function of attaching the polarizing plate to a substrate such as an LCD panel. The surface protection films 24a and 24b are attached to protect the polarizing plate from foreign substances and are separated from the polarizing plate when a process of attaching the polarizing plate to the substrate is performed.

FIGS. 2a and 2b are sectional views of a conventional polarizing plate having an optical compensation film and a conventional polarizing plate having an integrated type protection film, respectively.

The polarizing plate shown in FIG. 2A comprises a polarizer 31, protection films 33a and 33b arranged on the top and the bottom of the polarizer 31 to protect the polarizer 31, respectively, and an optical compensation film 35 arranged on one of the protection films 33a and 33b. The polarizer 31 may include poly vinyl alcohol (PVA), and the protection films 33a and 33b may include tryacetyl cellulose (TAC). A viewing angle compensation film having a viewing angle compensation function may be used as the optical compensation film.

The polarizing plate shown in FIG. 2B comprises a polarizer 41, a protection film 43 arranged on one surface of the polarizer 41 to protect the polarizer, and an integrated type protection film 45 arranged on the other surface of the polarizer 41 to have a polarizer-protecting function as well as an optical compensation function. The polarizer 41 may include poly vinyl alcohol (PVA), and the protection film 43 may include tryacetyl cellulose (TAC).

As described above, the optical compensation film 35 or the integrated protection film 45 is different from the protection film in view of materials and components. Thus, there is a difference in moisture absorption rate between them. As a result, there is a problem in that the polarizing plate may be bent due to difference between shrinkage and expansion rates of components of the polarizing plate. This will be described in detail below with reference to FIG. 3.

FIGS. 3A and 3B are views showing differences between shrinkage rates of components of a conventional polarizing plate in a state where the polarizing plate with an optical compensation film is attached to an LCD panel.

FIG. 3A shows a state where a polarizing plate with the optical compensation film 35 of FIG. 2A is attached to the top of an LCD panel 39 using an adhesive 37, and FIG. 3B shows a state where a polarizing plate with the integrated protection film 45 of FIG. 2B is attached to the top of an LCD panel 49 using an adhesive 47.

Referring to FIG. 3A, the moisture absorption rates of the polarizer 31, the protection films 33a and 33b, and the optical compensation film 35 are different from one another. Since both moisture absorption and shrinkage rates are generally in substantially proportion to each other, a shrinkage or expansion rate increases as a moisture absorption rate increases. In general, the moisture absorption rate of poly vinyl alcohol (PVA) is about 5% or more, that of tryacetyl cellulose is about 1.5% and that of an optical compensation film is about 3%. Accordingly, in FIG. 3A, dimensional changes become larger in the order of the protection films 33a and 33b ($\Delta L_3$), the optical compensation film 35 ($\Delta L_1$) and the polarizer 31 ($\Delta L_2$).

Even in the case of FIG. 3B, since the moisture absorption rates of the polarizer 41, the protection film 43 and the integrated protection film 45 are different from one another, there is difference between dimensional changes of the components when the polarizing plate is attached to an LCD panel and the LCD panel is then driven.

As described above, the dimensional changes cause bending of the polarizing plate and thus there is a problem in that the polarizing plate gets loose from the LCD panel, which consequently causes a problem of light leakage.

FIGS. 4A to 4C are views showing light leakage defects in driving a conventional LCD panel to which a polarizing plate with an optical compensation film is attached. FIG. 4A shows the state of the LCD panel during initial driving, and FIG. 4B shows a state where a light leakage phenomenon occurs in the LCD panel after driving for 50 hours. FIG. 4C shows a state where a light leakage phenomenon occurs in the vicinity of corners of the LCD panel upon estimation of reliability thereof.

SUMMARY OF THE INVENTION

In an exemplary embodiment, the present invention provides a polarizing plate in which bending thereof is reduced or effectively prevented by controlling a moisture absorption rate of an optical compensation film or an integrated type protection film with an optical compensation function, a method for manufacturing the same, and a liquid crystal display panel having the same.

An exemplary embodiment according to the present invention provides a polarizing plate including a polarizer for polarizing incident light; first and second protection films arranged respectively on top and bottom surfaces of the polarizer; and an optical compensation film arranged on the first or second protection film, wherein the optical compensation film has a moisture absorption rate similar to moisture absorption rates of the protection films.

Another exemplary embodiment according to the present invention provides a polarizing plate including a polarizer for polarizing incident light; a first protection film arranged on one surface of the polarizer; and a second protection film arranged on the other surface of the polarizer and simultaneously having a predetermined optical compensation function, wherein the second protection film has a moisture absorption rate similar to a moisture absorption rate of the first protection film.

Another exemplary embodiment according to the present invention provides a method for manufacturing a polarizing plate, the method including preparing a polarizer for polarizing incident light; (b) attaching first and second protection films for protecting the polarizer to top and bottom surfaces of the polarizer, respectively; (c) heat-treating an optical compensation film with a predetermined optical compensation function at a predetermined temperature such that the optical compensation film includes a moisture absorption rate substantially similar to moisture absorption rates of the first and second protection films; and (d) attaching the heat-treated optical compensation film to the first or second protection film.

Another exemplary embodiment according to the present invention provides a method for manufacturing a polarizing plate, the method including preparing a polarizer for polarizing incident light; (b) attaching a first protection film for protecting the polarizer to one surface of the polarizer; (c) heat-treating a second protection film having a polarizer-protecting function and a predetermined optical compensation function at a predetermined temperature such that the second protection film includes a moisture absorption rate substantially similar to a moisture absorption rate of the first protection film; and (d) attaching the heat-treated second protection film to the other surface of the polarizer.

BRIEF DESCRIPTION OF THE DRAWINGS

The above and other objects, features and advantages of the present invention will become apparent from the following description of exemplary embodiments given in conjunction with the accompanying drawings, in which.

DETAILED DESCRIPTION OF THE INVENTION

Figure 1:
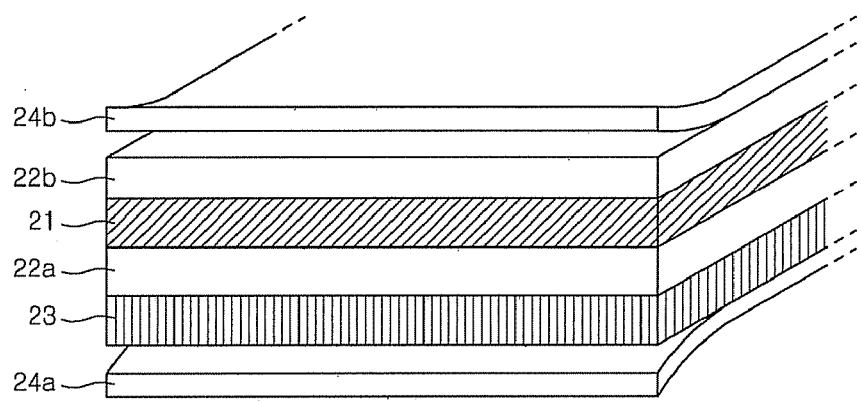
FIG. 1 is a view illustrating a structure of a general polarizing plate.
Figure 2A:
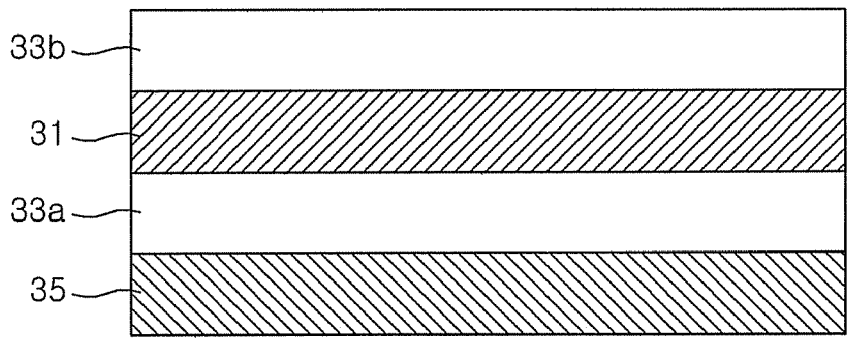
FIGS. 2A and 2B are sectional views of a conventional polarizing plate having an optical compensation film and a conventional polarizing plate having an integrated type protection film, respectively.
Figure 2B:
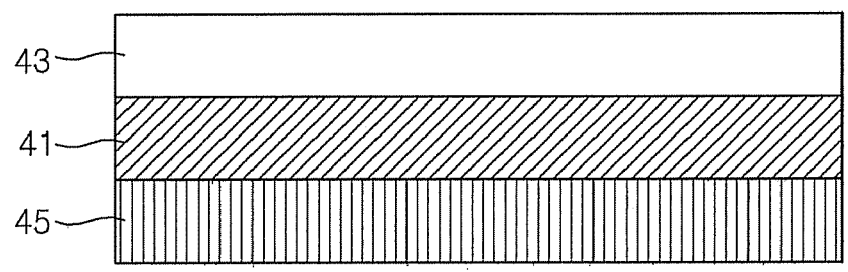
Figure 3A:
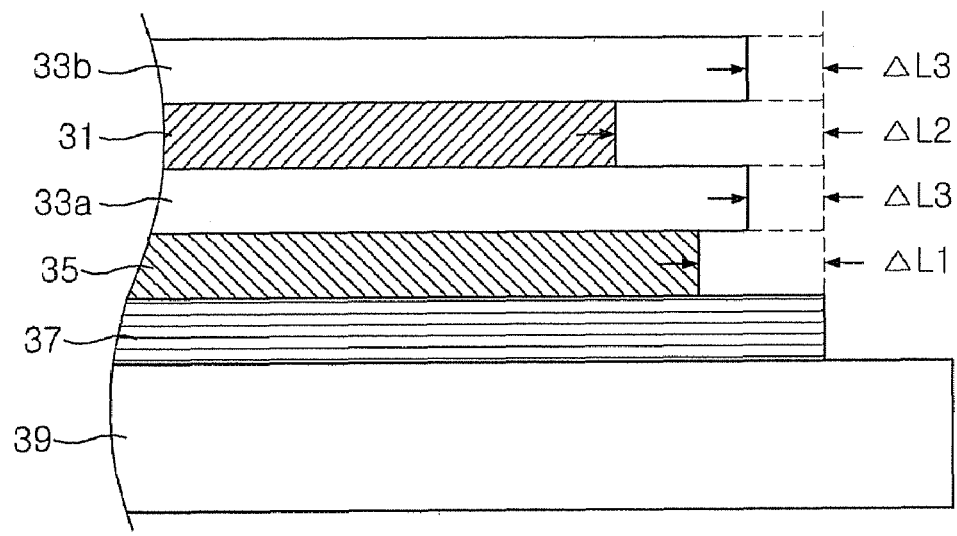
FIGS. 3A and 3B are views showing differences between shrinkage rates of components of a conventional polarizing plate in a state where the polarizing plate with an optical compensation film is attached to an LCD panel.
Figure 3B:
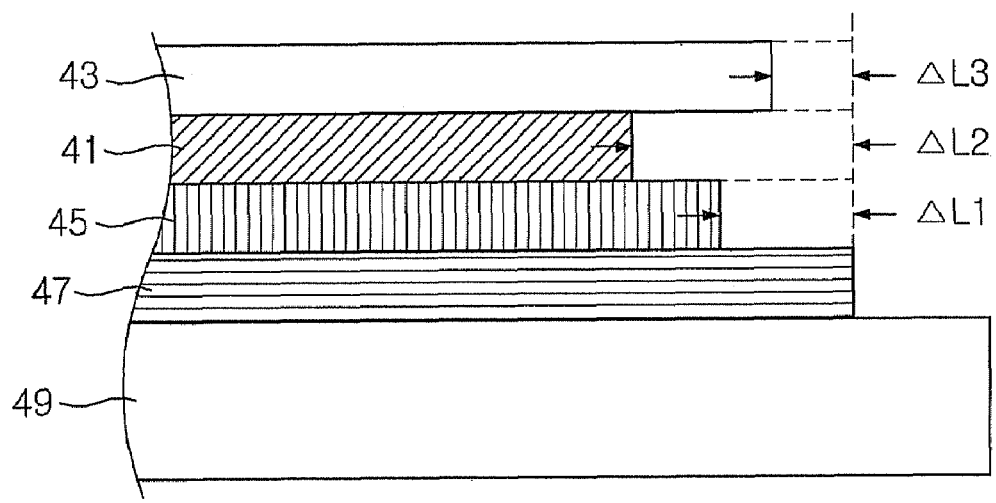
Figure 4A:
FIGS. 4A to 4C are views showing light leakage defects in driving a conventional LCD panel to which a polarizing plate with an optical compensation film is attached.
Figure 4B:
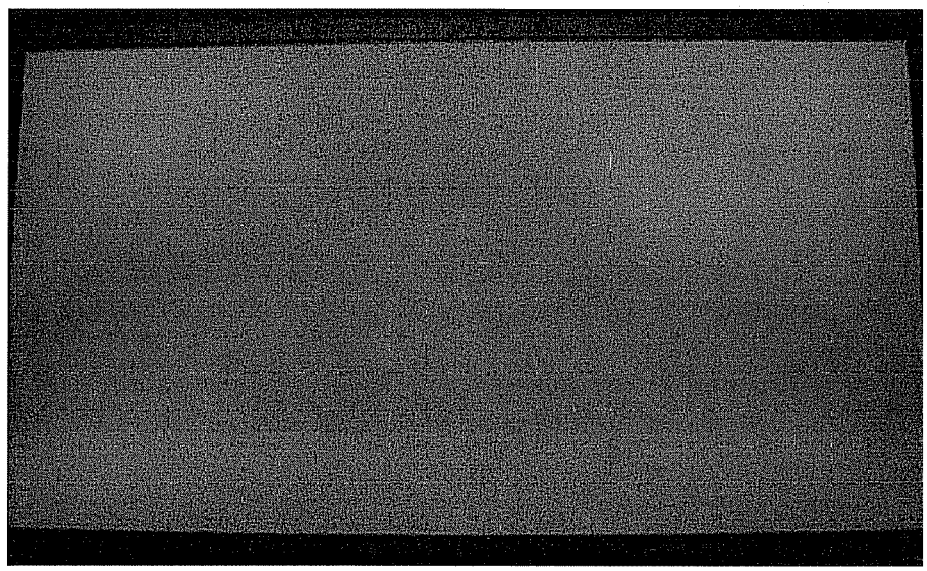
Figure 4C:
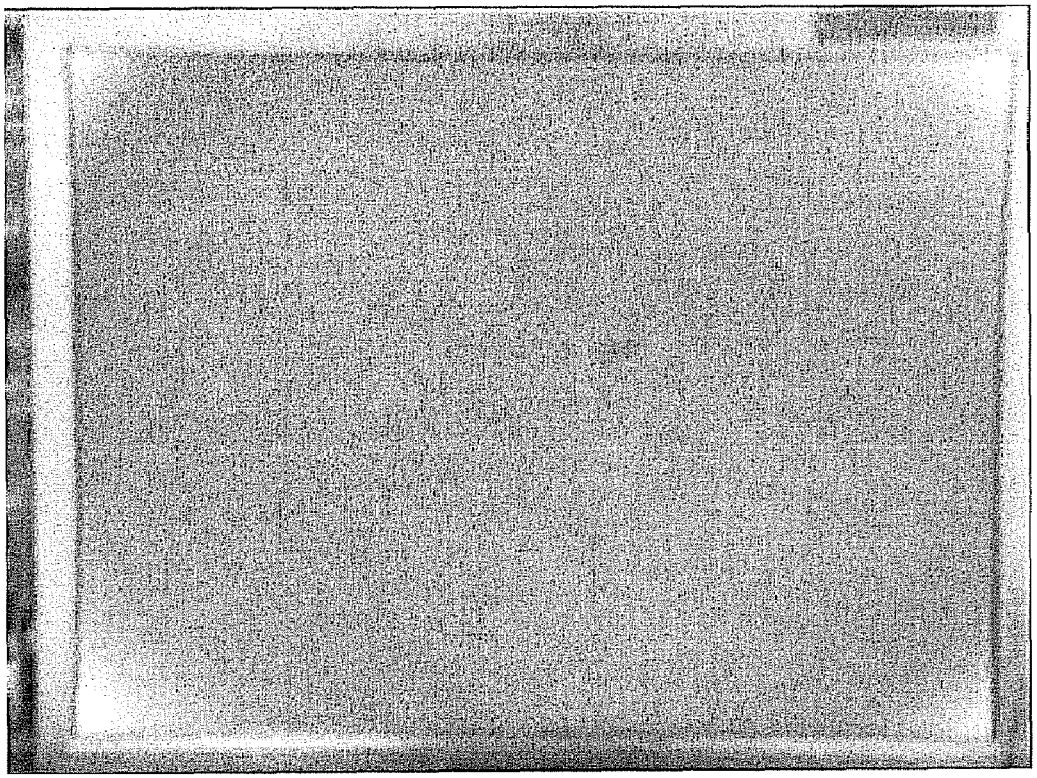

The invention is described more fully hereinafter with reference to the accompanying drawings, in which exemplary embodiments of the invention are shown.

This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on," another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings.

Figure 5A:
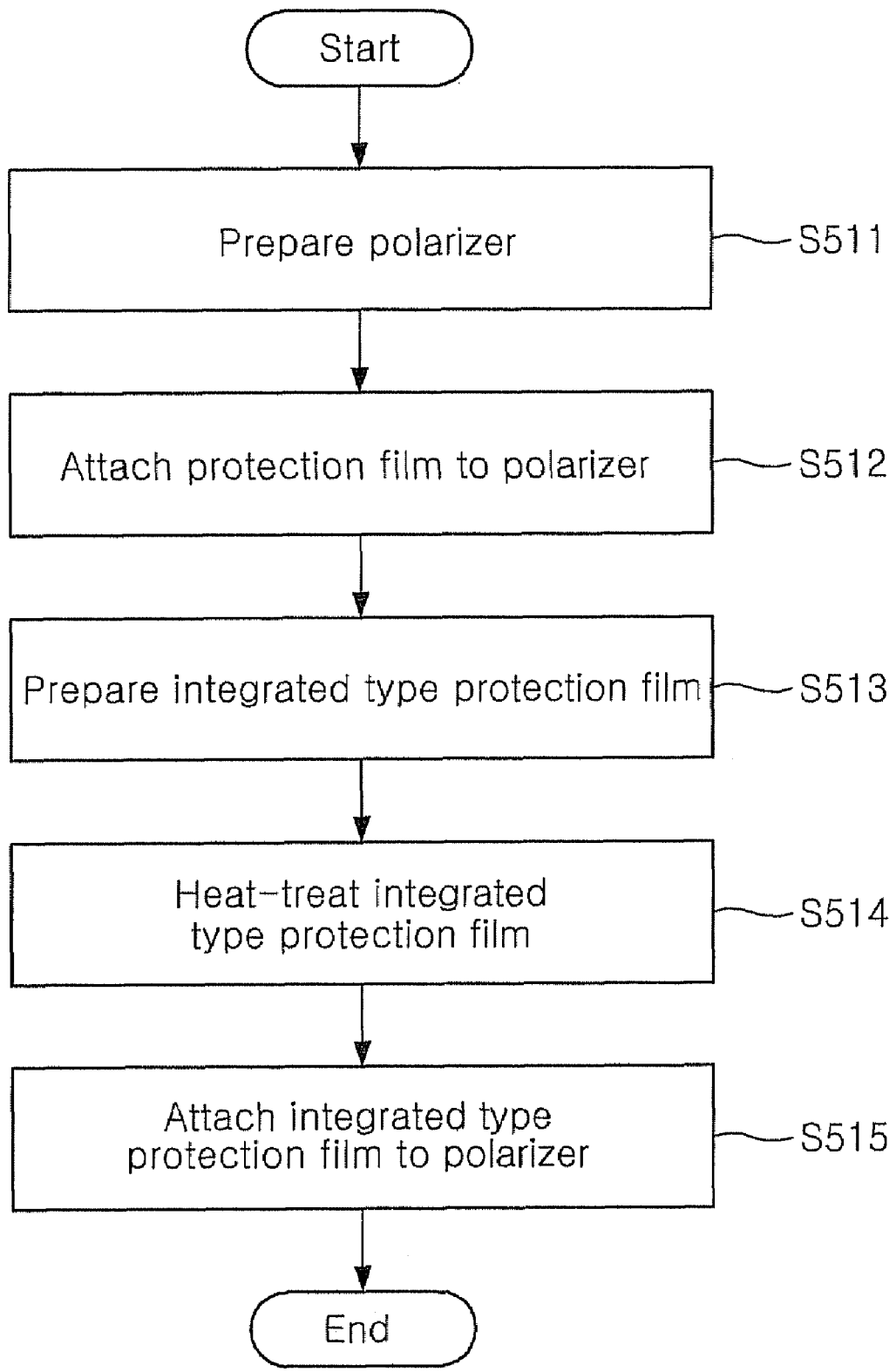
FIGS. 5A and 5B are flowcharts illustrating exemplary embodiments of methods for manufacturing a polarizing plate according to the present invention.

FIGS. 5A are 5B are flowcharts illustrating exemplary embodiments of methods for manufacturing a polarizing plate according to the present invention.

An exemplary embodiment of a method for manufacturing a polarizing plate according to the present invention will be explained with reference to FIG. 5A.

First, a polarizer for polarizing incident light is prepared (S511). In exemplary embodiments, the polarizer may be formed by stretching a PVA (Poly Vinyl Alcohol) film and dipping the stretched film into a solution of iodine ($I_2$) and a dichromatic dye so that iodine molecules and dye molecules may be arranged parallel to the stretching direction. Since the iodine molecules ($I_2$) and dye molecules exhibit a dichromatic property, the polarizer may have the function of absorbing light vibrating in the stretching direction and transmitting light vibrating in a direction substantially perpendicular to the stretching direction.

Since such a polarizer itself has weak mechanical strength in the direction of a transmission axis, and is shrunk or has a deteriorated polarization function due to heat or moisture, a protection film for protecting the polarizer is attached to one surface of the polarizer (S512). In one exemplary embodiment, the protection film may include triacetyl cellulose (hereinafter, referred to as "TAC"). TAC is used for the protection film for protecting the polarizer, since TAC has high light transmittance, relatively low birefringence, and easiness of lamination with the polarizer due to hydrophilicity by surface modification. In alternative exemplary embodiments, the protection film may include any of a number of materials satisfying the aforementioned conditions Next, an integrated type protection film for performing the polarizer-protecting function as well as an optical compensation function is prepared (S513).

In exemplary embodiments, the integrated type protection film may be capable of and perform the function of increasing a viewing angle such that the screen of an LCD can be distinctly viewed even though the screen is viewed at a position at an angle with respect to a direction normal to the screen. In alternative exemplary embodiments, the integrated type protection film may be capable of and perform a luminance-improving function or the function of converting linear polarized light into elliptical or circular polarized light.

In one exemplary embodiment, the integrated type protection film performs a viewing angle compensation function as well as the polarizer-protecting function. The integrated type protection film may include, but is not limited to, cellulose acetate propionate.

Then, the integrated type protection film undergoes heat treatment at a predetermined temperature for a predetermined period of time (S514).

Since both moisture absorption and shrinkage rates are generally in substantially proportion to each other, a shrinkage or expansion rate increases as a moisture absorption rate increases. In an exemplary embodiment, moisture absorption rates of the polarizer, the protection film and the integrated type protection film, which are components of the polarizing plate, may vary. In one exemplary embodiment, the moisture absorption rate of PVA used as the material of the polarizer may be about 5% or more, that of TAC used for the protection film may be about 1.5% and that of cellulose acetate propionate used as the material of the integrated type protection film may be about 3%.

In exemplary embodiments, the moisture absorption rate of the protection film arranged on one surface of the polarizer and the moisture absorption rate of the integrated type protection film arranged on the other surface thereof are designed or controlled to be substantially similar or essentially identical with each other. Advantageously, the shrink and expansion rates of the protection film and the integrated type protection film may be substantially similar or essentially identical to each other. To this end, the integrated type protection film undergoes heat treatment at a predetermined temperature for a predetermined period of time (S514). In one exemplary embodiment, the heat treatment is performed at a temperature of about 100° C. to 120° C. In another exemplary embodiment, the heat treatment is performed at a temperature of about 115° C. for approximately 30 to 60 seconds.

In an exemplary embodiment, the moisture absorption rate of the integrated type protection film undergoing heat treatment as described above may be reduced approximately 1.5%, such that the moisture absorption rate of the integrated type protection film is substantially similar to that of the protection film moisture absorption rate.

Then, the heat-treated integrated type protection film is attached to the other surface of the polarizer to complete a polarizing plate (S515).

Figure 5B:
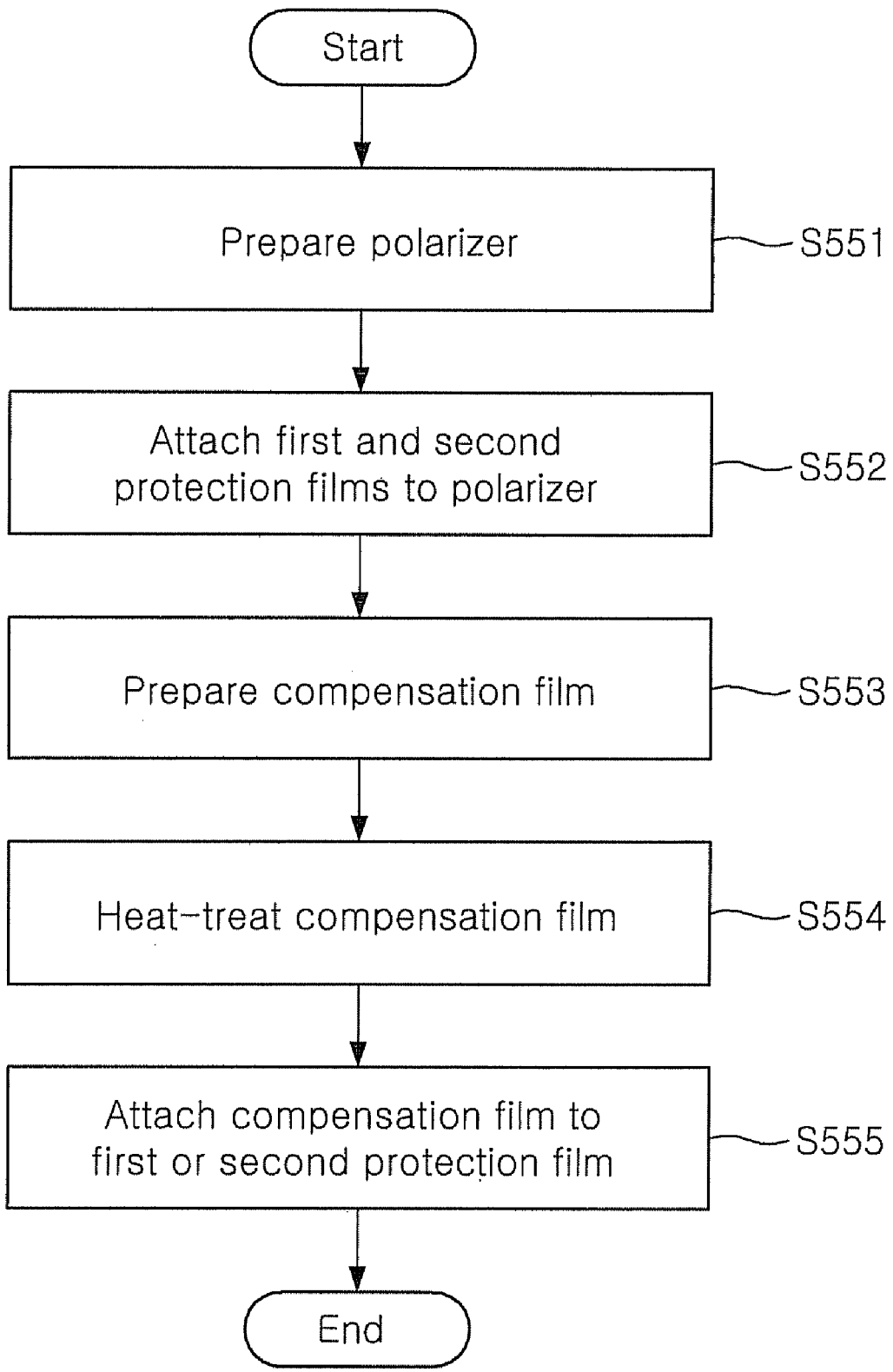

Another exemplary embodiment of a method for manufacturing a polarizing plate according to the present invention will be described with reference to FIG. 5B. The polarizing plate shown in FIG. 5B is different from that shown in FIG. 5A in that the former includes a separate optical compensation film, and the rest of components thereof are similar to each other.

First, a polarizer for polarizing incident light is prepared (S551). In exemplary embodiments, the polarizer may be formed of PVA (Poly Vinyl Alcohol).

Since such a polarizer itself has weak mechanical strength in the direction of a transmission axis, and is shrunk or has a deteriorated polarization function due to heat or moisture, protection films for protecting the polarizer are attached to both surfaces of the polarizer (S552). In one exemplary embodiment, the protection films may include TAC.

Next, an optical compensation film with an optical compensation function is prepared (S553).

The optical compensation film is a viewing angle compensation film capable of performing the function of increasing a viewing angle such that the screen of an LCD can be distinctly viewed even though the screen is viewed at a position at an angle with respect to a direction normal to the screen. In alternative exemplary embodiments, the optical compensation film may be capable of and perform a luminance-improving function or the function of converting linear polarized light into elliptical or circular polarized light.

In one exemplary embodiment, a cyclic olefin copolymer may be used for the optical compensation film to have the viewing angle compensation function.

Then, the optical compensation film undergoes heat treatment at a predetermined temperature for a predetermined period of time (S554).

Since both moisture absorption and shrinkage rates are generally in substantially proportion to each other, a shrinkage or expansion rate increases as a moisture absorption rate increases. In an exemplary embodiment, moisture absorption rates of the polarizer, the protection film and the optical compensation film, which are components of the polarizing plate, may vary. In one exemplary embodiment, the moisture absorption rates of PVA used as the material of the polarizer may be about 5% or more, that of TAC used for the protection film may be about 1.5% and that of cyclic olefin copolymer used as the material of the optical compensation film may be about 3%.

In exemplary embodiments, the moisture absorption rates of the protection films arranged on the top and bottom of the polarizer and the moisture absorption rate of the optical compensation film arranged on a surface of one of the protection films are designed or controlled to be substantially similar or essentially identical with each other. Advantageously, the shrink and expansion rates of the protection films and the optical compensation film may be substantially similar or essentially identical to each other. To this end, the optical compensation film undergoes heat treatment at a predetermined temperature for a predetermined period of time (S554). In one exemplary embodiment, the heat treatment is performed at a temperature of about 100° C. to 120° C. In another exemplary embodiment, the heat treatment is performed preferably at a temperature of about 115° C., for approximately 30 to 60 seconds.

In an exemplary embodiment, the moisture absorption rate of the optical compensation film undergoing heat treatment as described above may be reduced to about 1.5%, such that the moisture absorption rate of the integrated type protection film is achieved substantially similar to those of the protection films moisture absorption rate.

Then, the heat-treated optical compensation film is attached to any one of the protection films to complete a polarizing plate (S555).

FIGS. 6A to 6D are schematic sectional views illustrating an exemplary embodiment of a method for manufacturing a polarizing plate according to the present invention.

Figure 6A:
FIGS. 6A to 6D are schematic sectional views illustrating an exemplary embodiment of a method for manufacturing a polarizing plate according to the present invention.

Referring to FIG. 6A, a polarizer 110 for polarizing incident light is formed. In one exemplary embodiment, the polarizer 110 is formed of a PVA film.

Figure 6B:
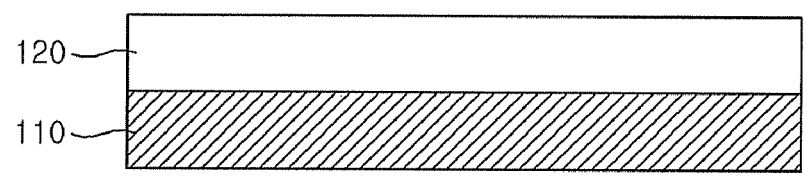

Referring to FIG. 6B, a protection film 120 for supporting and protecting the polarizer 110 is disposed on one surface of the polarizer 110. In one exemplary embodiment, TAC is used for the protection film, since TAC has high light transmittance, relatively low birefringence, and easiness of lamination with the polarizer due to hydrophilicity by surface modification.

Figure 6C:
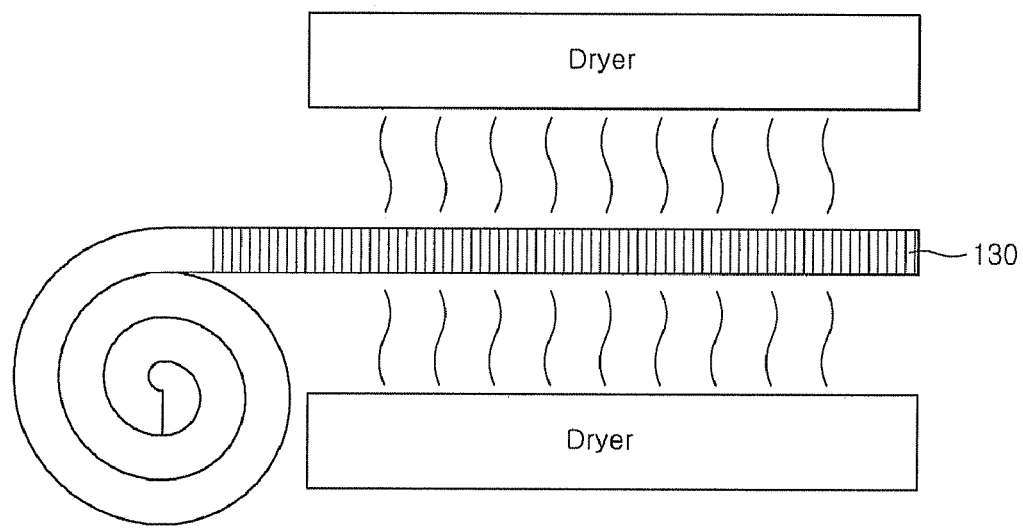

Referring to FIG. 6C, an integrated type protection film 130 for performing the polarizer-protecting function as well as the optical compensation function undergoes heat treatment through a dryer. The heat treatment may be performed while unwinding a roll of integrated type protection film such that a sheet is subject to the heat treatment of the dryer. In one exemplary embodiment, the integrated type protection film 130 includes cellulose acetate propionate. In another exemplary embodiment, the dryer is controlled to heat the integrated type protection film 130 at a temperature of about 100° C. to 120° C. In another exemplary embodiment, the heat treatment is preferably performed at approximately 115° C. for 30 to 60 seconds.

Figure 6D:
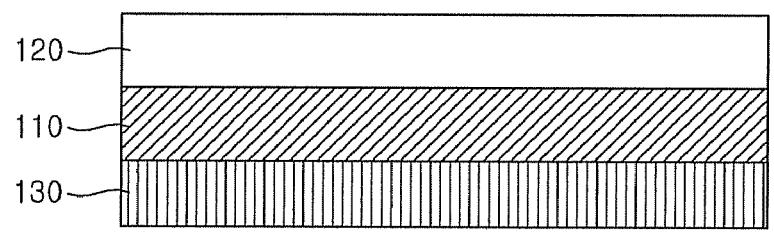

Referring to FIG. 6D, the integrated type protection film 130, which has undergone the heat treatment through the dryer, is attached on the other surface of the polarizer 110 (opposite to that of the protection film 120) to complete a polarizing plate with the integrated type protection film 130.

FIGS. 7A to 7D are schematic sectional views illustrating another exemplary embodiment of a method for manufacturing a polarizing plate according to the present invention.

Figure 7A:
FIGS. 7A to 7D are schematic sectional views illustrating another exemplary embodiment of a method for manufacturing a polarizing plate according to the present invention.

Referring to FIG. 7A, a polarizer 210 for polarizing incident light is provided. In exemplary embodiments, the polarizer 210 is formed of a PVA film.

Figure 7B:
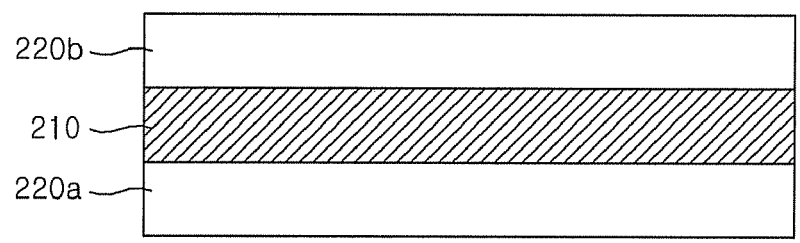

Referring to FIG. 7B, protection films 220a and 220b for supporting and protecting the polarizer 210 are disposed on both surfaces of the polarizer 210. In one exemplary embodiment, the protection films 220a and 220b are formed of TAC.

Figure 7C:
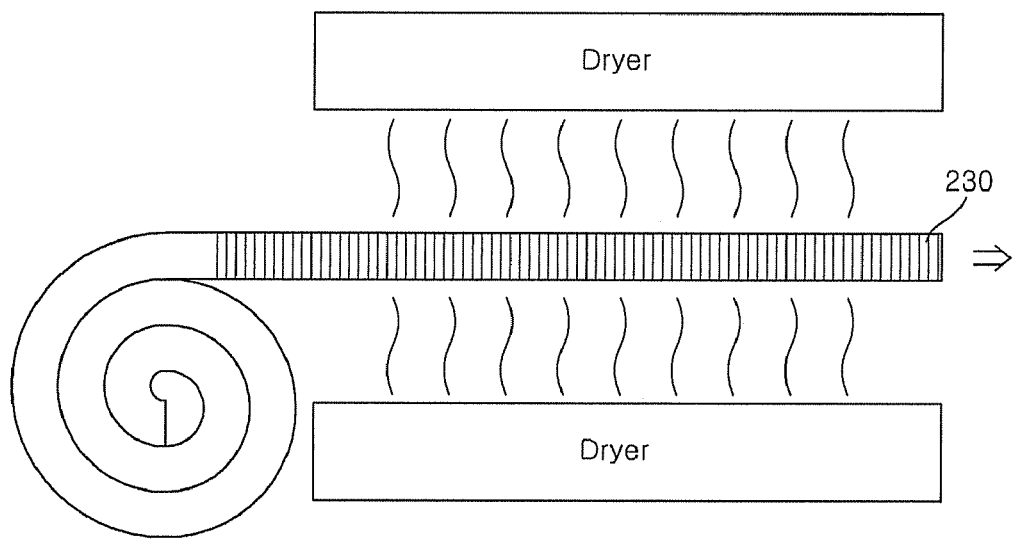

Referring to FIG. 7C, an optical compensation film 230 with an optical compensation function undergoes heat treatment through a dryer. The heat treatment may be performed while unwinding a roll of optical compensation film such that a sheet of the optical compensation film 230 is subject to the heat treatment of the dryer. In one exemplary embodiment, the optical compensation film 230 includes a cyclic olefin copolymer. In another exemplary embodiment, the dryer is controlled to heat the optical compensation film 130 at a temperature of about 100° C. to 120° C. In another exemplary embodiment, the heat treatment is preferably performed at approximately 115° C. for 30 to 60 seconds.

Figure 7D:
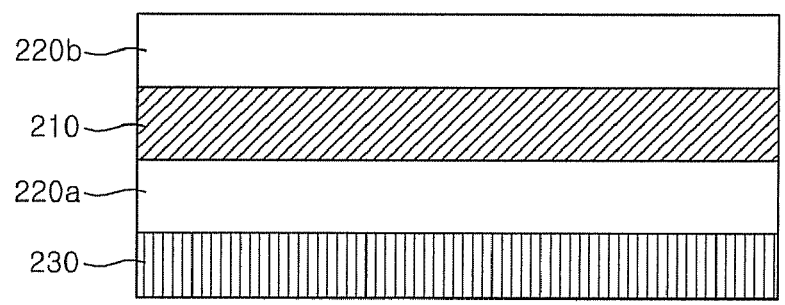

Referring to FIG. 7D, the optical compensation film 230, which has undergone heat treatment through the dryer, is attached to one of the protection films 220a or 220b to complete a polarizing plate with the optical compensation film 230. In alternative embodiments, the optical compensation film 230 may be attached to both of the protection films 220a and 220b, at outer surfaces respectively facing away from the polarizer 210.

Figures 8, 9A:
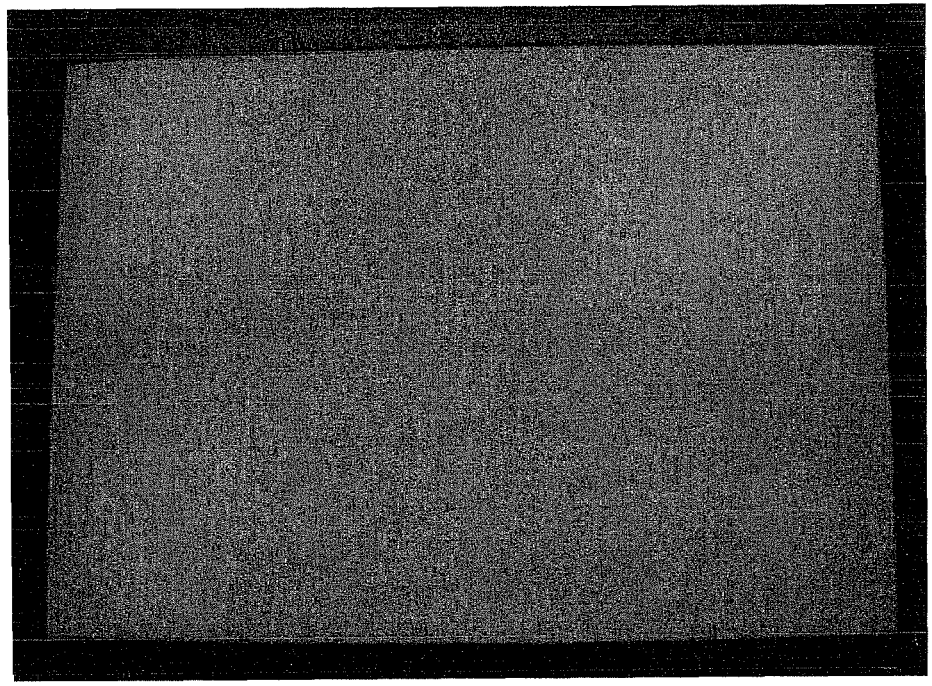
FIG. 8 is a table showing comparison results of a polarizing plate loosening from an LCD panel, for different sizes of LCD panels employing a conventional polarizing plate and an exemplary embodiment of the polarizing plate of the present invention.
FIG. 9A is a view showing an LCD panel employing a conventional polarizing plate.

FIG. 8 is a table showing comparison results of a phenomenon in which a polarizing plate gets loose from an LCD panel. Two sizes of LCD panels to be manufactured are represented with each size respectively employing a conventional polarizing plate and an exemplary embodiment of the polarizing plate of the present invention.

In case of a 17" LCD panel, the conventional polarizing plate gets loose from the LCD panel by about 0.66%, and the polarizing plate of the present invention gets loose from the LCD panel by about 0.05%.

Further, in case of a 32" LCD panel, the conventional polarizing plate gets loose from the LCD panel by about 20%, and the polarizing plate of the present invention gets loose from the LCD panel by about 5%.

The LCD panels including an exemplary embodiment of the polarizing plate of the present invention have less loosening than those LCD panels including the conventional polarizing plate.

Figure 9B:
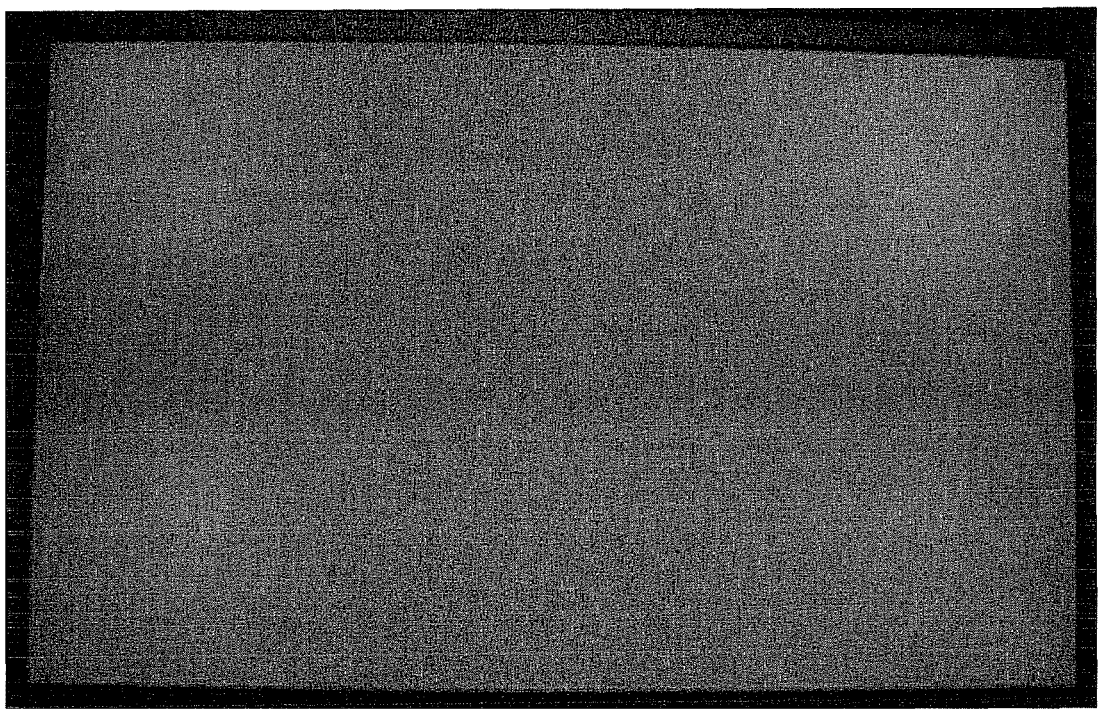
FIG. 9B is a view showing an LCD panel employing an exemplary embodiment of the polarizing plate of the present invention.

FIG. 9A is a view showing an LCD panel employing a conventional polarizing plate; and FIG. 9B is a view showing an LCD panel employing an exemplary embodiment of the polarizing plate of the present invention.

FIG. 9A shows an LCD panel with a conventional polarizing plate attached thereto, and FIG. 9B shows an LCD panel to which an exemplary embodiment of a polarizing plate according to the present invention having an optical compensation film or an integrated type protection film with a controlled moisture absorption rate is attached. It can be observed from comparison of FIGS. 9A and 9B that the area of light leakage and the quantity of light leakage are much smaller in the LCD panel with the polarizing plate according to an exemplary embodiment of the present invention attached thereto.

In an exemplary embodiment according to the present invention, an optical compensation film or an integrated type protection film with an optical compensation function undergoes heat treatment at a predetermined temperature before it is attached to a protection film or polarizer of a polarizing plate so that it can have a moisture absorption rate similar to that of the protection film. Then, the heat-treated optical compensation film or integrated type protection film is attached to the protection film or polarizer of the polarizing plate. The bending of the polarizing plate due to difference between the moisture absorption rates of the respective films is reduced. Advantageously, an amount of loosening of a polarizing plate from an LCD panel can be reduced or effectively prevented. At the same time, light leakage may also be reduced or effectively prevented.

The foregoing is merely the preferred embodiments of the polarizing plate, the method for manufacturing the same, and the LCD panel having the same according to the present invention. The present invention is not limited to the embodiments. It will be understood that those skilled in the art can make various modifications and changes thereto without departing from the scope and technical spirit of the present invention defined by the appended claims.

What is claimed is:

1. A polarizing plate, comprising:
    a polarizer for polarizing incident light;
    a first protection film arranged on one surface of the polarizer; and
    a second protection film arranged on the other surface of the polarizer and simultaneously having a predetermined optical compensation function,
    wherein the second protection film is heat treated at a predetermined temperature so that the second protection film has a moisture absorption rate substantially similar to a moisture absorption rate of the first protection film.

2. The polarizing plate as claimed in claim 1, wherein the polarizer comprises poly vinyl alcohol (PVA).

3. The polarizing plate as claimed in claim 1, wherein the first protection film comprises triacetyl cellulose (TAC).

4. The polarizing plate as claimed in claim 1, wherein the second protection film comprises cellulose acetate propionate.

5. The polarizing plate as claimed in claim 1, wherein the second protection film is heat treated at a temperature of 100 to 120° C. for 30 to 60 seconds for the second protection film to have the moisture absorption rate substantially similar to that of the first protection film.

6. The polarizing plate as claimed in claim 1, wherein a moisture absorption rate of the polarizer is greater than or equal to about 5% and the moisture absorption rate of the first protection film is about 1.5%.

7. A liquid crystal display panel comprising a polarizing plate according to claim 1.

8. A method for manufacturing a polarizing plate, comprising:
    (a) preparing a polarizer for polarizing incident light;
    (b) attaching a first protection film for protecting the polarizer to one surface of the polarizer;
    (c) heat-treating a second protection film having a polarizer-protecting function and a predetermined optical compensation function at a predetermined temperature so that the second protection film comprises a moisture absorption rate substantially similar to a moisture absorption rate of the first protection film; and
    (d) attaching the heat-treated second protection film to the other surface of the polarizer.

9. The method as claimed in claim 8, wherein the polarizer comprises poly vinyl alcohol (PVA).

10. The method as claimed in claim 8, wherein the first protection film comprises triacetyl cellulose (TAC).

11. The method as claimed in claim 8, wherein the second protection film comprises cellulose acetate propionate.

12. The method as claimed in claim 8, wherein the second protection film undergoes heat treatment at a temperature of 100 to 120° C. for 30 to 60 seconds.

* * * * *